Apr. 10, 1923.
J. G. VINCENT
1,451,034
MOTOR VEHICLE
Filed May 27, 1921
4 sheets-sheet 1
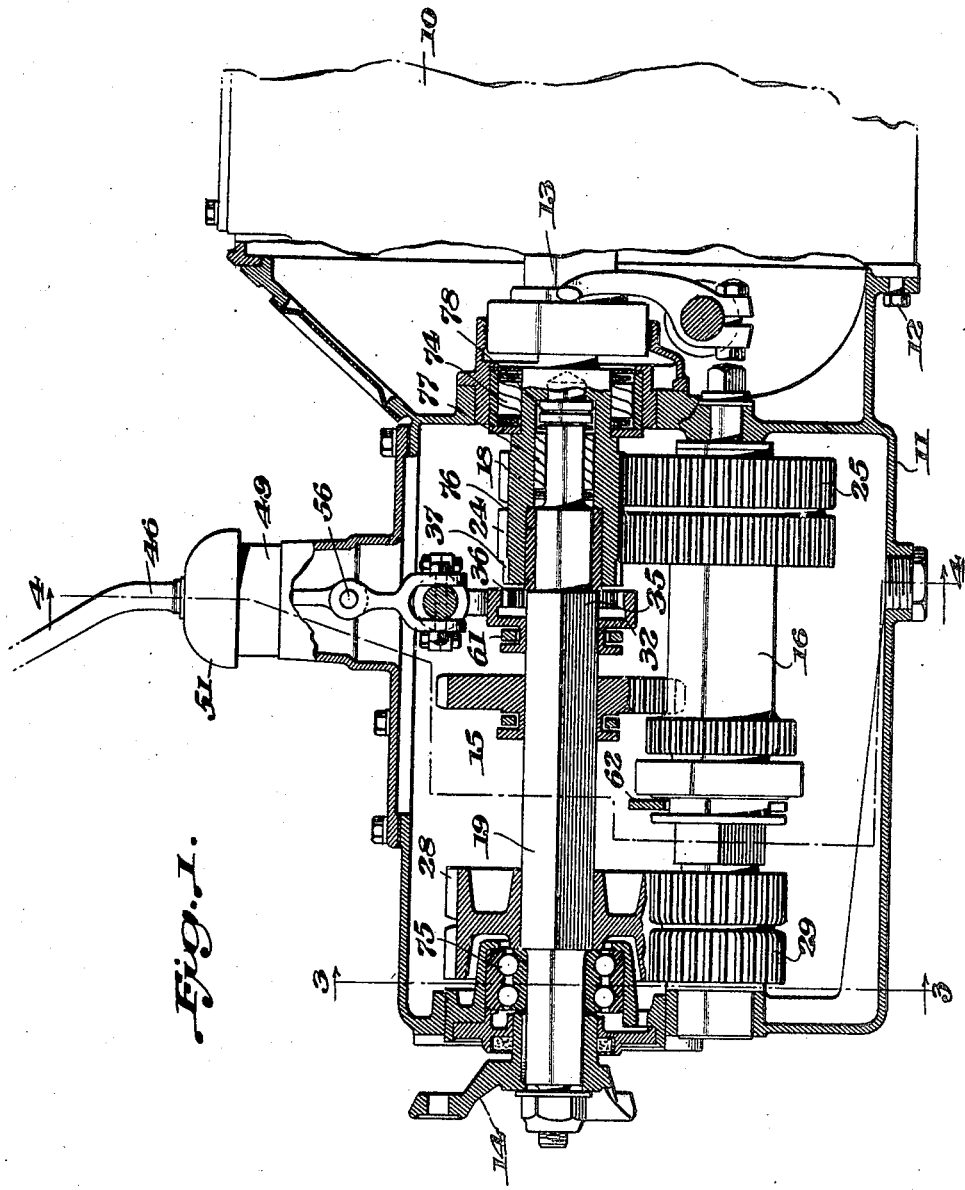
Inventor
Jesse G. Vincent,
By Milton Tibbetts
Attorney

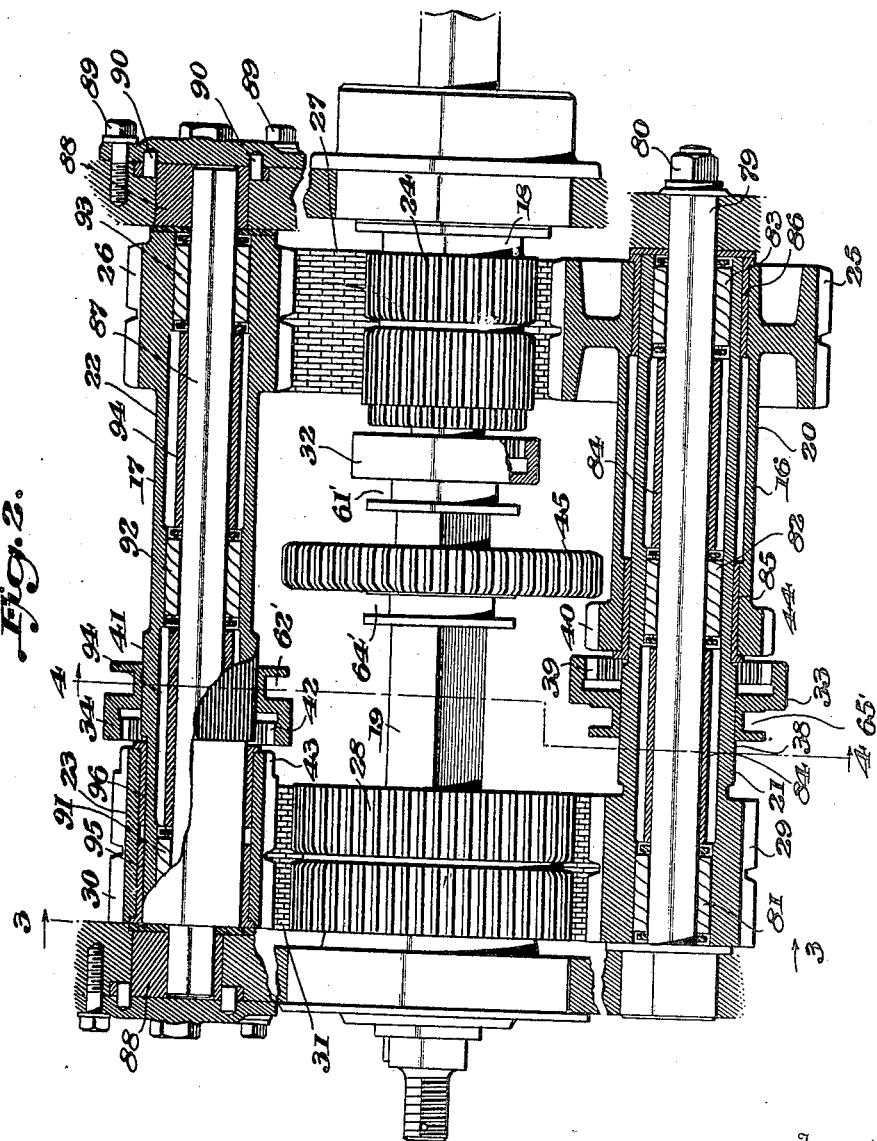

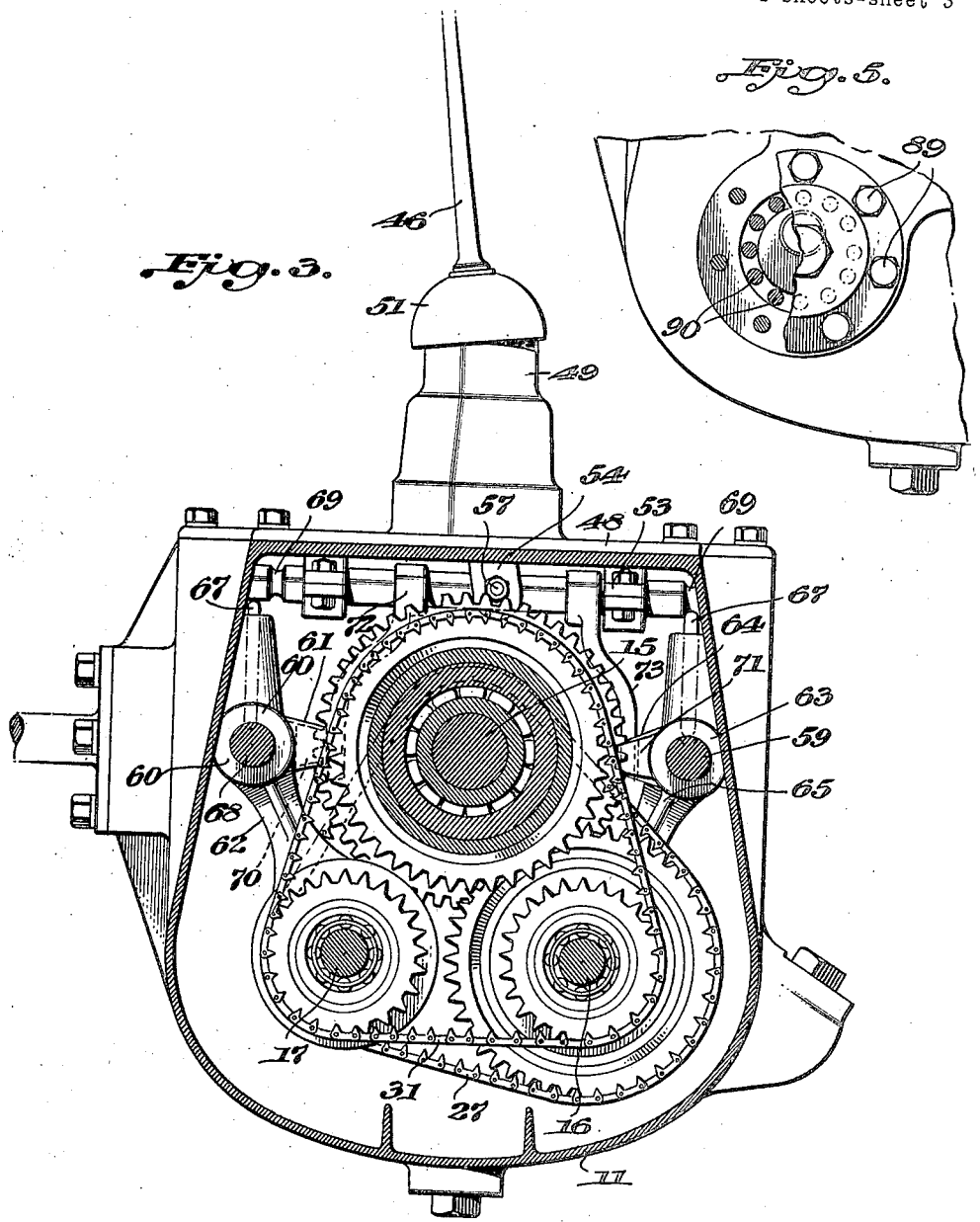

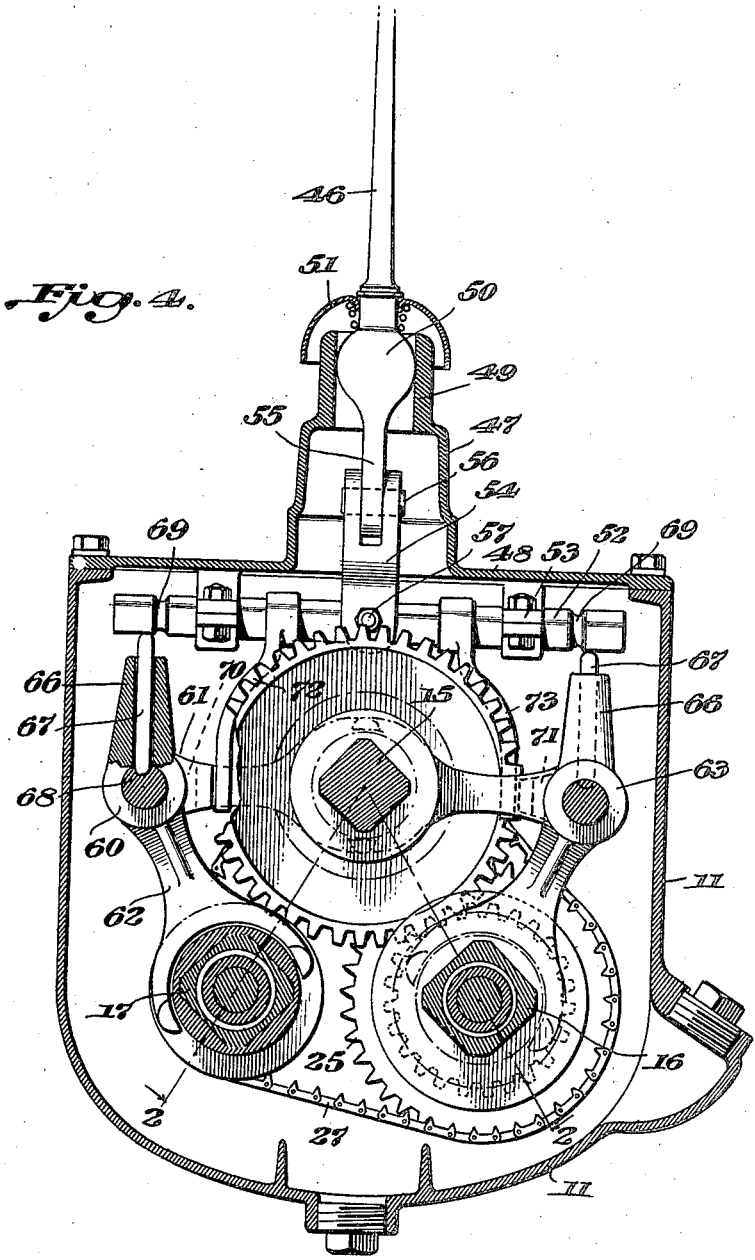

Patented Apr. 10, 1923.

1,451,034

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed May 27, 1921. Serial No. 473,095.

*To all whom it may concern:*

Be it known that I, JESSE G. VINCENT, a citizen of the United States, and resident of Detroit, Wayne County, State of Michigan, have invented certain new and useful Improvements in Motor Vehicles, of which the following is a specification.

This invention relates to motor vehicles and particularly to the transmission mechanism thereof.

One of the objects of the present invention is to provide a transmission mechanism which will be efficient and quiet in operation.

Another object of the invention is to provide a three-speed and reverse transmission mechanism of the chain type with the use of but two sprocket chains.

Another object of the invention is to provide a simple and relatively inexpensive transmission mechanism of the chain and sprocket type.

Another object of the invention is to simplify the mounting of the shafts of a chain and sprocket transmission mechanism.

Other objects of the invention will appear from the following description taken in connection with the drawings which form a part of this specification, and in which:

Figure 1 is a vertical sectional view thru a portion of a motor vehicle power plant embodying the invention;

Figure 2 is a longitudinal sectional and part elevation view substantially on the line 2—2 of Figure 4;

Figure 3 is a transverse sectional view on the line 3—3 of Figures 1 and 2;

Figure 4 is a transverse sectional view on the line 4—4 of Figures 1 and 2; and

Figure 5 is a fragmentary end elevation of the gear box or case, with parts broken away.

Referring to the drawings, 10 represents the motor casing of a motor vehicle and 11 is a gear box or gear case which may be detachably secured to the motor casing as by a series of bolts 12. This gear case forms a support for the transmission mechanism by which the power of the motor is carried to the wheels of the vehicle. The shaft which is driven directly by the motor, as thru a friction clutch (not shown) is indicated at 13 and the member which connects with the propeller shaft is indicated at 14, this member being in the form of a universal joint one part only of which is shown in Figure 1. The speed changing or transmission mechanism is arranged between these parts 13 and 14 as will be hereinafter more fully described.

The transmission mechanism comprises in general three main shafts 15, 16, and 17 respectively, which shafts are triangularly arranged in the gear box as shown particularly in Figures 3 and 4. In Figure 2 these shafts are spread out as if they were all in one plane, for convenience of observation and description, but this is not their real relationship as will be observed by the line 2—2 on Figure 4.

Each of said main shafts 15, 16 and 17 is a two-part shaft, that is, each shaft comprises two independent shafts which may be relatively rotated or may be rotated together as will be presently described. Thus the shaft 15 comprises a driving shaft 18 which is secured to or may be a part of the shaft 13 above described, and a driven shaft 19, the shafts 18 and 19 of course being coaxial. The shaft 16 comprises a part 20 and a part 21, these parts or shafts also being coaxial. The shaft 17 comprises a part 22 and a part 23, these parts or shafts also being coaxial.

The parts 18, 20 and 22 of shafts 15, 16 and 17 respectively are connected to rotate together by a sprocket and chain connection, the respective sprockets being indicated at 24, 25 and 26 and the chain being indicated at 27. The sprockets 24 and 26 have preferably substantially the same number of teeth but the sprocket 25 is somewhat larger in order to give a slower movement to the shaft or part 20 relatively to the shafts 18 and 22.

The parts 19, 21 and 23 of the shafts 15, 16 and 17 respectively are connected to rotate together by a sprocket and chain connection, the respective sprockets being indicated at 28, 29 and 30 and the chain being indicated at 31. The sprockets 29 and 30 preferably have the same number of teeth so that the shafts 21 and 23 will rotate at the same speed, but the sprocket 28 is somewhat larger so that it will rotate more slowly relative to said shafts 21 and 23, to obtain the reductions in speed hereinafter referred to.

Each of the two-part shafts 15, 16 and 17 above described is provided with a sliding clutch or locking device whereby the two parts of the shaft may be coupled together for rotation together or may be uncoupled so that the two parts of the shaft may rotate independently. These coupling devices are respectively indicated by numerals 32, 33 and 34, for the shafts 15, 16 and 17. The device 32 slides on an angular part 35 of the shaft 19 and has teeth 36 which are adapted to cooperate with teeth 37 on the shaft part 18. The coupling device 33 slides on an angular or squared portion 38 of the shaft part 21 and has teeth 39 which cooperate with teeth 40 on the shaft part 20. The coupling device 34 slides on an angular or squared portion 41 of the shaft part 22 and has teeth 42 which are adapted to cooperate with teeth 43 on the shaft part 23. In the drawings these clutch devices are shown in inoperative positions but it will be understood that the devices 32 and 33 may be moved to the right to engage cooperating clutch teeth and the device 34 may be moved to the left for the same purpose.

A driving connection is also provided between the part 20 of shaft 16 and the part 19 of shaft 15. This connection is in the form of a sliding gear device. There is a pinion 44 on the shaft part 20, which pinion may be a continuation of the teeth 40 above described, if desired, and a gear 45, on the shaft part 19 is adapted to slide on the squared part 35 of said shaft 19 so that it may be brought into engagement with the pinion 40 or be moved out of engagement therewith. The gear and pinion are shown in disengaged position in Figures 1 and 2. The gear 45 is somewhat larger than the pinion 44 in order that a reduction in speed may be obtained.

It is intended that the clutch devices 32 and 34 shall be moved together to effect different speed ratios, and that the coupling device 33 and the gear 45 shall be moved together for the same purpose. The mechanism for doing this will be hereinafter described. In the drawings the clutch devices and the gear 45, which may be termed the reverse gear, are shown in "neutral" position, that is, they are all disengaged so that no drive will be transmitted from the shaft 13 or the driving shaft 18.

Referring to Figure 2, by moving the clutch 33 to the right the two parts of shaft 16 will be coupled together so that they will rotate as one shaft. The gear 45 will be moved to the right with the clutch 33 but it will remain out of driving connection. With the two parts of the shaft 16 thus coupled, the drive will be from the driving shaft 18 thru the chain 27 to the shaft 20, then to the shaft 21 and thru the chain 31 to the driven shaft 19. Since the sprocket 24 is smaller than the sprocket 25 thru which this drive is transmitted the shafts 20 and 21 will rotate at a slower speed than the driving shaft 18, and since the sprocket 29 is smaller than the sprocket 28 the driven shaft 19 will be rotated at a slower speed than the shaft 21. Consequently there is a double reduction of speed between the shafts 18 and 19 and a very low relative speed will therefore be transmitted to the latter shaft. This is termed the "low speed position" of the parts.

Still referring to Figure 2, if the clutch 33 and the gear 45 are now moved together to the left so that the clutch is uncoupled and the gear 45 is moved into mesh with the pinion 44 the "reverse gear position" of the parts will be attained. In this position the drive is at a reduced speed from the driving shaft 18 to the shaft 20 and by another reduction and a reversal of direction from the shaft 20 to the shaft 19 thru the gears 44 and 45.

Still referring to Figure 2, if the clutch 33 and gear 45 are returned to the neutral position in which they are shown in the drawing and the clutches 32 and 34 are moved to the left so that the clutch 32 still remains idle and the clutch 34 engages the shaft 23, the "intermediate speed position" will be reached and the drive will be from the driving shaft 18 at no reduction in speed to the shaft 17 and from the latter shaft thru the chain 31 to the driven shaft 19, the latter drive being at a reduction in speed because of the difference in number of teeth between sprockets 30 and 28. This will give a single reduction in speed which is of course less than the double reduction obtained in the low speed position.

Still referring to Figure 2, if the clutches 32 and 34 are moved together to the right so that the clutch 34 is out of engagement with the shaft 23 and the clutch 32 is engaged with the shaft 18 the "high-speed position" or "direct drive" will be reached. In this position the drive is direct from the driving shaft 18 to the driven shaft 19 and at the same speed. In this instance there is no transmission of power thru any of the other shafts, except of course enough to rotate them on their bearings.

The means for shifting the clutches and the gear is illustrated in Figures 1, 3 and 4. It includes a gear shift lever 46 mounted in an up-standing boss 47 of the cover 48 of the gear box 11. The upper portion of the inner wall of the boss 47 is cylindrical as at 49 and the lever 46 has a spherical or ball part 50 which fits in the cylindrical part of the boss so that it will form a trunnion for the lever and at the same time permit the lever to be moved longitudinally of the boss a slight amount. A dust cap 51 may be provided if desired.

A rock shaft 52 is mounted in lugs 53 inside the cover 48 so that the shaft may both rock and be moved endwise in the lugs. This rock shaft is mounted above the gearing and crosswise of the gear shafts. It has an arm 54 which is rigidly connected to it and which extends upwardly into the boss 47 where it is connected to the lower end 55 of the gear shift lever 46 as by a pivot pin 56. The connection of the arm 54 to the rock shaft 52 is a pivotal one also as shown at 57 so that the rocking of the lever 46 from right to left in Figure 4 will move the rock shaft 52 endwise and the rocking of the lever 46 in Figure 1 will rock the shaft 52 in the lugs 53. In these rocking movements the lever 46 moves endwise slightly in the boss because of the angularity of the levers.

The clutch and gear shifting devices are mounted on two rods 58 and 59 which are supported in the gear box longitudinally of the gear shafts and preferably alongside of the shaft 15. Mounted to slide on the rod 58 is a shifter device 60 having a fork 61 and a fork 62, the fork 61 engaging in an annular groove 61' in the clutch device 32 and the fork 62 engaging in an annular groove 62' in the clutch device 34 so that the clutches 32 and 34 may be moved together. Mounted to slide on the rod 59 is a shifter device 63 having a fork 64 and a fork 65, the fork 64 engaging in an annular groove 64' formed in the hub of the gear 45 and the fork 65 engaging in an annular groove 65' in clutch device 33 so that the gear 45 and the clutch 33 may be moved together.

Each of the shifter devices 60 and 63 has an up-standing boss 66 and a locking pin 67 which is adapted to engage in a recess 68 in the upper part of one of the rods 58, 59. This engagement takes place when the parts are in neutral position as shown particularly in Figure 4 and the pins 67 are held in their locking position by contacting with the rock shaft 52. Said rock shaft is formed with annular grooves 69 which, when they are correctly positioned, will permit the pins 67 to be moved upwardly out of locking position so that the particular shifter device in which the locking pin is mounted may be moved from neutral position. By the position of the grooves 69 it is evident that but one of the locking pins 67 can be unlocked at any given time, the other pin remaining in locked position until the rock shaft 52 is shifted to bring the groove 69 in line with the locking pin.

The shifter device 60 is provided with a notched lug 70 and the shifter device 63 is provided with a notched lug 71, the notches of which lugs are adapted to be respectively engaged by shifter arms 72 and 73. When one of these lugs is engaged by its shifter arm the shifter device may be moved on its mounting by rocking the shaft 52, because when the parts are in this position the groove 69 of the rock shaft is in releasing position for the particular locking pin 67. This is illustrated in Figure 3 where the shift lever 46 has been moved to the left. This has shifted the rock shaft 52 to the right and has unlocked the shifter device 63. At the same time the shifter arm 73 is in engagement with the lug 71. In this position the gear shift lever 46 may be moved to rock the shaft 52 and the shifter device 63 will, thru its forks 64 and 65, move the gear 45 and clutch 33 from neutral position to either of their extreme positions. And during this movement the shifter device 60 is securely locked by the pin 67 which cannot be retracted by reason of its contact with the rock shaft 52.

It will be understood that the other shifter device may be similarly moved, and the shifter device 63 locked by moving the rockshaft 52 to its other extreme position.

The shafts 15, 16 and 17 are mounted in the gear box for quiet and lasting operation. Referring particularly to Figure 1, the shaft 15 is mounted in bearings 74 and 75 in the front and rear walls respectively of the gear box. The two parts of the shaft are telescoped and a plain bearing 76, a roller bearing 77 and a thrust bearing 78 are provided between them. This makes a very staunch construction and permits of no buckling or end play.

The shaft 16 is mounted on a rod 79 which extends thru the gear box from one end to the other and is securely and rigidly fastened to the gear box as by a nut 80. The part 21 of the shaft 16 is rotatably mounted directly upon the rod 79 as by the three separated roller bearings 81, 82 and 83. Separators 84 may be used if desired. The part 20 of the shaft 16 is shown as mounted on two plain bearings 85 and 86 on the hollow sleeve part of the part 21. This provides a strong and secure mounting for this countershaft.

The shaft 17 is mounted somewhat like the shaft 16 except that the rod 87 upon which it is supported is adjustably mounted in the casing or support. This rod 87 is supported eccentrically in blocks 88 which are themselves rotatably mounted in the walls of the casing. These blocks may be rotated for a given adjustment and then secured in place as by a series of bolts 89 and pins 90. The slack of the chains may thus be taken up by adjusting the position of the rod 87.

The part 22 of the shaft 17 is rotatably mounted on the rod 87 as by three separated roller bearings 91, 92 and 93 and separators 94 are also used. The shaft part 23 is mounted on plain bearings 95 and 96 on the extended sleeve portion of the part 22. This also provides a rigid mounting as well as an adjustable one.

It will be understood that other forms of the mechanism may be made without departing from the spirit or scope of the invention as defined by the claims.

Having described my invention, what I claim and desire to secure by Letters Patent is:

1. In a transmission mechanism, the combination of three shafts triangularly arranged, each of said shafts comprisig two coaxial relatively rotatable members, a positive clutch device for each of said shafts so that the members of said shafts may be made to rotate together or independently, a sprocket on each member of said shafts, chains for said sprockets, a gear rigidly secured to a member of one shaft, and a sliding gear keyed to a member of another shaft and adapted to be moved into mesh with the first said gear.

2. In a transmission mechanism, the combination of a driving shaft, a coaxially driven shaft, a driving countershaft having chain and sprocket connection with the driving shaft, a driven countershaft coaxially with the driving countershaft and having chain and sprocket connection with the driven shaft, sliding clutch connections between the respective pairs of coaxial shafts, and a sliding gear connection between the driving countershaft and the driven shaft.

3. In a transmission mechanism, the combination of three two-part shafts triangularly arranged, a sliding clutch for each of said shafts for locking the parts thereof together, chains and sprockets for the shafts, means for moving two of said clutches together to couple one and uncouple the other and vice versa, and means to independently move the other clutch.

4. In a transmission mechanism, the combination of three two-part shafts triangularly arranged, a sliding clutch for each of said shafts for locking the parts thereof together, chains and sprockets for the shafts, a sliding gear connection from a part of one shaft to a part of another shaft, means for moving two of said clutches together to couple one and uncouple the other and vice versa, and means to independently move together the other clutch and the sliding gear.

5. In a transmission mechanism, the combination with a support, of a driving shaft and coaxial driven shaft mounted in said support, a rod spaced from and rigidly mounted in said support, a shaft rotatably mounted on said rod, a second shaft rotatably mounted on the first said shaft, sprocket and chain connections from the driving shaft to the first said rotatably mounted shaft, a sprocket and chain connection from said second rotatably mounted shaft to said driven shaft, and a sliding clutch connection between said rotatably mounted shafts.

6. In a transmission mechanism, the combination with a support having separated walls, of a rod mounted in said support, a hollow shaft rotatably mounted on said rod and having a sprocket at one end and a bearing part at the other end, said shaft also having an intermediate angular part, a second shaft rotatably mounted on the bearing part of the first shaft said second shaft having sprocket teeth thereon, and a sliding member on the angular part of the first said shaft and adapted to be moved into clutching relation with the said second shaft.

7. In a transmission mechanism, the combination with a support of a rod rigidly mounted therein, a hollow shaft rotatably mounted on said rod, a second hollow shaft rotatably mounted on the first said shaft, each of said shafts having a sprocket thereon and said second shaft having a gear, and a sliding clutch device on the first shaft adapted to co-operate with said gear for locking the shafts to rotate together.

In testimony whereof I affix my signature.

JESSE G. VINCENT.